United States Patent [19]

Winegar et al.

[11] 4,312,961

[45] Jan. 26, 1982

[54] POLYMERIC FLUOROCARBON ROTOMOLDING/ROTOLINING COMPOSITION

[75] Inventors: Donald L. Winegar, Kettering; Joseph M. Arde, Jr., Clarksville, both of Ohio

[73] Assignee: The Duriron Company, Inc., Dayton, Ohio

[21] Appl. No.: 222,571

[22] Filed: Jan. 5, 1981

[51] Int. Cl.$^3$ ............................................... C08K 3/10
[52] U.S. Cl. ........................................ 525/4; 264/127
[58] Field of Search ............................................. 525/4

[56] References Cited

U.S. PATENT DOCUMENTS

| | | |
|---|---|---|
| 3,180,895 | 4/1965 | Harris, Jr. et al. ................... 526/247 |
| 3,432,511 | 3/1969 | Reiling ................................. 526/254 |
| 3,438,388 | 4/1969 | Schenck, Jr. ........................ 264/127 |
| 3,459,213 | 8/1969 | Schenck, Jr. et al. ............... 264/127 |
| 3,537,700 | 11/1970 | Schenck, Jr. et al. ............... 264/127 |

*Primary Examiner*—Stanford M. Levin
*Attorney, Agent, or Firm*—St. Onge, Steward, Johnston, Reens & Noe

[57] ABSTRACT

A novel plastic composition, and process of its preparation and application, are disclosed having particular utility in providing metal castings or the like with bubble-free, highly inert, plastic linings or coatings. The predominant portion of the novel composition comprises a perfluoroalkoxy side chain modified fluorocarbon polymer but also includes, in effective minor amount, metallic tin and preferably also additional oxidation or degradation stabilizers.

18 Claims, No Drawings

POLYMERIC FLUOROCARBON ROTOMOLDING/ROTOLINING COMPOSITION

BACKGROUND OF THE INVENTION

1. Field of the Invention

This invention relates to novel compositions and a process of their preparation and application for improving the resistance of fabricated metal components subjected to corrosive conditions, by lining or coating those components with highly inert melt-processable plastic material, more particularly a perfluoroalkoxy side chain modified fluorocarbon polymer composition especially suited to rotolining, rotomolding and even rotocoating processing. Although these processes differ technically in a number of respects, for the sake of convenience the term "rotomolding" is used herein to refer to all three generically unless otherwise indicated.

2. Description of the Prior Art

In chemical engineering, energy generation and similar industrial applications, there are frequent requirements for equipment such as pumps, tanks or other vessels and associated ducting for handling fluids under severe service conditions. Not only are the fluids themselves frequently corrosive to the metals with which they come in contact, but they may also be under substantial pressure and/or at elevated temperatures, thus imposing severe stresses on the equipment. In services involving such aggressive environmental conditions, the choice of metals or alloys suitable or capable of giving practical service life becomes very limited indeed, and even those metals which may be acceptable often are not available. Frequently the equipment designer is confronted with a dilemma in selecting between a material suitable to meet strength requirements necessitated for mechanical reasons, and a different material dictated by corrosion resistance considerations. Unfortunately a substantial compromise is generally involved if a single construction material is used. Accordingly resort is commonly made to combining two or more materials to satisfy the conflicting requirements.

The combination of plastic materials as linings, coatings or films with base metal components has long been practiced as a means of securing the strength advantage of metals concomitantly with the corrosion resistance of certain plastics in fabricating a final product. The use of plastic coatings and/or linings with metal components has accordingly found considerable application in industry, as illustrated by patents issued in this field. An example is found in U.S. Pat. No. 3,432,511 which discloses the use of a partially degraded polytetrafluoroethylene (PTFE) powder dispersed in a suitable liquid vehicle or carrier for brush or spray coating application. In U.S. Pat. Nos. 3,438,388, 3,459,213 and 3,537,700, again PTFE powder compositions are employed but in these cases are isostatically molded to form linings for conduit valves or the like.

The choice of PTFE polymers for corrosion resistance service is a natural one arising from their excellent physical properties and inertness to chemical attack. However PTFE polymers are not adapted to conventional thermal molding processes, since they lack the melt-processing capability of commonly used coating materials such as polyethylene, nylon, fluorinated ethylene propylene copolymers ("FEP"), "Halar" (ECTFE copolymer), etc., for example. Special molding procedures must therefore be resorted to. On the other hand those above-named readily melt-processable materials lack the same degree of high temperature resistance, lubricity and superior chemical inertness exhibited by PTFE polymers.

SUMMARY OF THE INVENTION

In the embodiments described below in detail, the present invention is more particularly illustrated in providing novel plastic linings for engineered metal components; e.g. fluid handling equipment such as centrifugal pumps, valves, pipe fittings and various types of containers or vessels such as heat exchangers, storage tanks, reaction chambers and the like. In general, the invention employs as a plastic lining material for equipment of the type mentioned above, a class of polymers known as "Teflon PFA" introduced by E. I. duPont de Nemours & Co., Inc. which combine the carbon-fluorine backbone of fluorocarbons with perfluoroalkoxy side chain groupings. This class of polymers is described in U.S. Pat. No. 3,180,895 and elsewhere, for example in "Encyclopedia of Polymer Science and Technology, Supplement No. 1," John Wiley & Sons, Inc. 1976, pages 260–267. This class of polymers is characterized by having much of the processing ease of other melt-processable fluorocarbons, while possessing improved end-use properties similar to those of PTFE. Although the possibility of using this polymer to advantage for lining metal castings was recognized at an early stage, initial attempts to make effective use of it in rotomolding techniques ran into problems. Rotomolding offers many advantages in a number of instances over other melt-processing techniques, one of the principal cases being that where complex shapes are required. Under compression or injection molding procedures, cores are required. Not only are these an added expense but there is the problem of removing them on completion of the molding operation. Since cores are not necessary in rotomolding, this process offers definite advantages for that reason but due to the lack of pressure application on the polymer (which of course is present in conventional injection or compression molding), rotomolding plastic lined parts have exhibited a strong tendency to development of macroporosity or bubble formation in the molded coating, leading to locally thinned coating sections and consequent susceptibility to corrosive attack of the underlying metal at those locations.

It has now been discovered that this problem can be effectively overcome by the incorporation of certain addition agents with the base polymer material to formulate an effective molding powder, and by employing certain processing steps for converting the raw polymer material as received from the supplier to a uniform powdered form suitable for rotomolding application on metal products.

At present it is preferred to use conventional rotomolding procedures for preparation of the protective plastic shell in or on the metal castings, since as mentioned above that type of processing eliminates the need for cores in the parts being coated. The convenience of core elimination, plus obviating the stress development that accompanies core use, are distinct advantages in fabricating finished parts.

In rotomolding, a thin-walled permanent mold is normally used into which the specially prepared molding powder is introduced. After heating of the mold to cause the powder particles to coalesce, the mold is cooled and the resulting molded plastic shell is removed. The shell is then placed into or onto the part it is designed to protect and mechanically held in place. In the case of rotolining, a metal casting or heavy walled metal fabrication is itself used as the mold, and the plastic material becomes a permanent part constituting an inert lining on the wall of the casting. In either case, the lining or coating process begins by placing a weighed charge of the plastic powder into the metal casting or mold, under room temperature conditions. The casting or mold is then closed to retain the powder. In the typical procedure, the molds or castings are then clamped in fixtures called spiders located at the free ends of a multi-armed framework radiating from a central turntable, and the spider is arranged to be rotated in two mutually perpendicular planes to provide uniform distribution. Each arm is capable of being indexed by the turntable to progressively move it from a loading-/unloading station to an oven, then into an air/water spray cooling chamber, and finally back to the loading-/unloading bench or station. The powder is tumbled by rotation of the fixture and is heated during residency of the mold in the oven. When the polymer powder approaches its melting point, the particles begin to melt at the hot metal surface and gradually form a deposit on the metal surface during a so-called "sugar stage" in the melt-processing cycle. As the heating continues, melting progresses away from the metal surface until the powder particles coalesce to form a smooth, finished layer. Optimally this coalescence of powder particles is uniform and continuous so that the resulting plastic layer is dense and free of voids, bubbles, etc. As mentioned, however, that optimal result has heretofore not been readily obtained by rotomolding of PFA. The bubble problem arises, apparently, from gas formation upon normal degradation of the polymer (or some secondary product therein) due to thermal instability at the molding temperatures involved.

It has now been discovered that elimination of bubbles and similar voids in the finished lining can be accomplished, surprisingly, by incorporation of metallic tin, more especially in powder form, into the polymeric molding powder charge introduced into the mold or metal casting to be lined. The addition of other agents, principally high temperature stable deoxidizing agents or degradation retarding agents, particularly when combined with a special preparatory processing of the polymer material as received from the supplier, further assures the elimination of any voids.

It is accordingly an object of this invention to provide various compositions suitable for achieving bubble-free, modified PFA lined or coated metal castings, and to teach a process of preparing the meterial for effective use in conventional rotomolding/rotolining equipment.

DETAILED DESCRIPTION OF THE PREFERRED EMBODIMENTS

Various grades of "Teflon" PFA polymer have been produced and sold commercially by E. I. duPont de Nemours of Wilmington, Del. Depending on the particular type of service for which the PFA lined article processed in accordance with this invention is designed, certain grades or mixtures of grades of commercially available PFA polymers may be preferred over others for reasons of moldability and optimized physical, chemical and thermal properties. In general, the various grades of PFA material available represent compositions classified by the manufacturer according to melt-flow numbers (MFN) which vary generally inversely in a non-linear relationship with molecular weight; i.e., higher molecular weight material has a lower MFN. This melt-flow number is determined by a test based on ASTM Standard 3307, and is a measure of the amount of extrudite from a standard size orifice under a standard dead load during a ten-minute test period.

In accordance with this invention, the presently preferred method of rotolining metal castings, for example items such as pumps, valve bodies, fittings, etc., requires a preparatory operation in respect of the PFA material received from the supplier. In general, the size of the polymer particles in "as received" condition resulting from the reactor process employed in their production is not satisfactory for rotolining purposes, especially if there is a high precentage of fines in the material. This latter condition tends to cause bridging in corners and clumping or "snow-balling," as the particles stick to each other rather than to the metal surface to be coated during the rotolining procedure.

The present invention accordingly incorporates preferentially a pretreatment of the "as received" material to convert it to a powder composition of proper particle size range for satisfactory rotolining results. In this, the "as received" material is first compacted at room temperature into thick disks under a pressure of 8,000 to 8,500 psi. These disks are friable and can be readily ground, as in a Fitz mill, to reform a powder. This is then classified by sieving to provide a more uniform particle size, preferably a maximum of 35 mesh with a preponderance of the distribution up to 200 mesh although a small proportion can be even finer. Predominance of the larger mesh particles gives better moldability, while the smaller size particles gives higher strength. All material above 35 mesh is reground until 100% yield from the compacts is achieved.

The degradation control additives mentioned above and discussed hereinafter in greater detail may be blended into the classified PFA particles, and the blended mixture subjected to a heat densification operation. The additives may, alternatively, be added to the polymer when introduced into a mold. The heat densification spoken of involves rotating the polymer/additive mixture in a heated drum for about one hour at about 590° F.; i.e., just below its melt temperature range. This changes the particles to a lighter color and to a harder consistency. Heat densification helps in achieving greater consistency of result in terms of assuring that the PFA linings in the finished product are completely bubble-free. The resulting pre-treated PFA powder mixture is then ready for use in standard rotolining operations, as generally practiced in accordance with the description above.

In the present invention, the single factor contributing most to inhibiting a tendency of PFA polymers to develop bubble formation in linings produced by the rotolining process is the discovery of the effect of incorporating metallic tin in the molding composition. Only very small amounts of tin, preferably in powder metal form, are required. Even when used along, without the other preparatory steps mentioned above, tin serves to substantially reduce that bubble formation problem. However greater consistency of result is obtained by combining the tin addition with both the heat densification discussed above and preferrably also with the addition of other oxidation or degradation control agents. While the exact function of these addition agents is not yet fully understood, it is postulated that they serve as oxygen scavengers, as heat stabilizers, or as anti-oxidants which sequester the formation of carbon dioxide emitted as a by-product of the degradation process inherently occurring in the PFA polymer during the rotolining process. The choice of these addition agents is limited by the requirement of the stability at the melting temperature of the PFA polymer. Further details of these will appear below.

Discovery of the beneficial effect of tin additions to PFA polymers for rotomolding/rotolining processes has now made it practical to work with a variety of the commerically available PFA powders. Whereas prior attempts to use different lots of PFA material, even where these were supposedly of the same grade, continually caused problems of bubbles forming in the molded linings, that problem can now be essentially eliminated by the incorporation of tin alone in the starting polymeric material. The combination of tin addition with heat densification and other supplemental stabilizing addition agents provides even greater tolerance for molding variables unavoidably encountered in practical operations. That is, this combination of pre-treatment steps in preparing the PFA material for rotomolding-/rotolining operations gives the molding operator a bigger molding "window" in the time-temperature programming during molding for assuring bubble-free linings in the finished products. In other words a wider spread between acceptable minimum and maximum molding temperatures and minimum and maximum molding times is made possible. Among other advantages, this translates directly into a capability for producing thicker linings than would otherwise be possible.

Specific examples embodying the invention will now be described.

Example I

"Teflon TE9727" is a commercial grade of PFA polymer obtainable from the duPont Company. It is a polymer of the type disclosed in U.S. Pat. No. 3,180,895, typically having a MFN in the range of 4 to 9. This material is supplied in powder form and while it possesses limited moldability by compression techniques as received, parts molded from it by rotomolding/rotolining procedures invariably contain a multitude of small bubbles on the order of 1/64 inch to 1/32 inch in diameter.

In accordance with this invention the "TE9727" powder is first compacted into disks and then ground and sieved to effect more uniform particle size distribution, as described above. The powder is then placed in a rotating drum together with 0.1% of tin powder, based on the weight of the initial PFA powder. In addition, 0.03% by weight of N-phenyl-α-naphthylamine (PNA) and 0.02% carbon black are also added. Carbon black is principally used as a pigment. This powder mixture is rotated in the drum and heated at a temperature of around 580° F. to 590° F. for one hour. This heat densification produces a lightening in color of the polymer powder mixture and an increase in particle hardness.

After cooling, a measured amount of the modified PFA powder is placed in the cavity of a rotomolding mold. The mold is then mounted in a fixture on one of the arms of the rotolining spider of a McNeil Akron rotolining machine, and the machine indexed to advance the arm into the melting chamber or oven. During residency in the oven of the mold containing the PFA powder, the mold is rotated by the fixture about mutually perpendicular axes to cause the powder to tumble and continuously contact all surfaces of the mold.

In this molding operation, a balance must be maintained between a temperature sufficiently high to effect adequate melting of the polymer while avoiding temperatures that cause excessive degradation to occur. Also a balance has to be achieved between the minimum time that the part being rotolined must be held in the oven to effect adequate melt-flow to completely cover the metal surfaces, while again avoiding excessive polymer degradation from keeping the part in the oven for too long a period.

For the material specified above, the preferred time-temperature program varies with the complexity of the part to be molded. For a simple shape, such as a cylinder of uniform wall section, a typical oven cycle would consist of a temperature of about 700° F. for 75 minutes. For this same type of part, melt flow of the modified PFA powder adequate for rotomolding purposes can be obtained at temperatures below the maximum discussed above. For example, adequate melt-flow can be obtained at 675° F. if that temperature is maintained for 90 minutes. Thus the rotolining operator is given an operating "window" affording substantial flexibility in selecting practical time-temperature conditions to be programmed for any given product to be lined.

On completing the melt-lining program, the McNeil Akron rotolining apparatus is activated to index the spider arm to a cooling station. During transition to this station as well as during its residency thereat, the spider arm and clamping fixture continue to cause the part to be rotated while cooling air and/or water spray introduced at the station reduce the temperature of the part to ambient room conditions.

On completing the cooling operation, the rotolining machine is again indexed to bring the finished part of the loading/unloading station where it is removed and replaced by another part to be lined.

The lining of the finished part is found on inspection to be free of all bubbles or other porosity.

EXAMPLE II

The general procedure described in Example I is followed but in this case the "as received" PFA polymer is a blend of 70/30 parts by weight of "TE9714" and "TE9715." These grades differ in their molecular weights, the former being the lower weight material. The blend produces a powder having substantially the same MFN as the polymer used in Example I. Adjustments of the time-temperature program during rotomolding may be required. Again, smooth linings without bubble occlusion are produced by the rotomolding procedure.

EXAMPLE III

The procedure of Example I is once again repeated, but in this case the supplemental stabilizing agent (PNA) is omitted from the molding powder, leaving tin powder as the only addition to the "TE9727" material. No bubble formation in the lining was evidenced.

EXAMPLE IV

The molding procedure described in Example I is followed, but in this case a more complex part such as a pipe fitting is used as the mold housing. This would again necessitate a change in the time-temperature program to a cycle of about 725° F. for 45 minutes, followed by an immediate change to an additional 45 minutes at 675° F. This again results in an essentially bubble-free lining.

The absence of bubble formation in the molded products is observed with the addition of tin by itself for all commercial grades of PFA tested. However, experience shows that some still unaccounted for variations between different batches or lots of polymer, nominally of the same grade specification but apparently produced at different times, may exist from time to time and accordingly the incorporation of the supplemental agents in addition to tin is still preferred to insure consistency of bubble-free results.

In similar manner, the heat densification step may often be omitted without encountering bubble problems, provided tin is present; but again the densification step provides improved consistency of result.

The tolerance for ramdom variation of conditions in materials and molding technique is thus maximized by incorporating the additional agents together with the tin, and with the heat densification step, in the preparation of the molding powder.

Test results have established that PFA polymers having MFN's from about 3 (higher molecular weight grades) to 15 (lower molecular weight grades) are capable of being used in rotolining/rotomolding processes without bubble problems, provided of course that tin is incorporated in the molding powder. In general, the amount of tin found to be effective is from around 0.01%, at which a few scattered bubbles appear in the linings, up to about 0.2%. At this higher level, the degree of bubbling again begins to increase, and continues to increase at least up to 0.75% tin. The optimum range appears to be from 0.05% to 0.10%.

Metallic tin in pure powder form is preferred for ease of controlling the amount introduced into the molding powder; but it should be noted that effective tin introduction can be achieved simply by using a heavily tin-plate lined metal drum in the heat densification process. Obviously repeated use of the drum requires periodic replacement of the tin plating in the drum. Additional tests to determine if organo-tin compounds may be employed show severe bubbling problems, even when the other supplemental addition agents (e.g., PNA) are present. The reason for this is judged to be due to heat decomposition of the organic component, leaving the tin content in a form that does not effectuate the improvement exhibited by the addition of the metal itself.

The organic supplemental agent PNA mentioned above is presently the most effective known; but it seems apparent that other known polymer molding stabilizers could be used, provided they are selected with a view to possessing the necessary temperature degradation resistance. Commercially available materials known as "Good-Rite 3114" and "Good-Rite 3174" produced by B. F. Goodrich Company and consisting essentially of tris (3,5-di-tert-butyl-4-hydroxy benzyl) isocyanurate are possible agents for applications where lower (660° F.) molding temperature conditions can be employed. "Ionol" (2.6-di-tert-butyl-4-methol phenol) produced by Ciba-Geigy Chemical Co. is another supplemental stabilizer showing potential for bubble reduction or elimination. In general, the amount of organic supplemental agent used in the molding composition ranges from about 0.01% to 0.5% by weight of the base polymer, with 0.03% being optimum for PNA. Combinations of PNA or other additions may also be used.

What is claimed is:

1. A perfluoroalkoxy side chain modified fluorocarbon base polymer composition useful in melt-processing applications to produce bubble-free moldings, said composition including tin as an addition agent in effective amount to reduce bubbling.

2. A modified polymer composition as defined in claim 1, wherein the tin addition is present in the form of metallic tin powder.

3. A modified polymer composition as defined in claim 2, wherein the amount of tin is from about 0.01% to 0.2% by weight of the polymer.

4. A melt-processable plastic composition for use in rotomolding and rotolining applications to provide molded plastic shapes of extremely low porosity, essentially free of bubbles, said composition comprising in combination a base component consisting in predominant amount of a fluorocarbon polymer having perfluoroalkoxy side chains, and having a melt flow number (MFN) of from about 3 to 15; and tin metal sufficient in amount to suppress the tendancy to bubble formation in the molded plastic shape.

5. A plastic composition as defined in claim 4, wherein its MFN is about 4 to 8, and the amount of tin is about 0.01% to 0.2% by weight of the polymer.

6. A plastic composition as defined in claim 4, which further includes a supplemental polymer stabilizing addition agent effective at the molding temperature of the composition.

7. A plastic composition as defined in claim 6, wherein said supplemental stabilizing addition agent is organic and is selected from the group comprising 2,6-di-tert-butyl-4-methyl phenol, N-phenyl-α-naphthylamine, tris (3,5-di-tert-butyl-4-hydroxy benzyl) and mixtures thereof.

8. A plastic composition as defined in claim 6, wherein the amount of said supplemental organic stabilizing addition agent is about 0.01% to 0.5%.

9. A plastic composition as defined in claim 5, wherein said tin is present in pure powder metal form at from 0.05% to 0.10% by weight and said composition also includes about 0.03% N-phenyl-α-naphthylamine.

10. The method of treating perfluoroalkoxy side chain modified fluorocarbon base polymers preparatory to melt-processing them to form molded shapes, which comprises compacting the "as received" polymer particulate under a pressure of at least about 8000 psi to produce a solid compact;

grinding said compact to again reduce the polymer to powder form and screening it to achieve particles of uniform size which pass through a sieve of 35 mesh; and incorporating into said polymer powder at some point before melt-processing it a small but significant amount of metallic tin sufficient to inhibit bubble formation in the polymer during melt-processing.

11. The method as defined in claim 10, wherein the metallic tin is introduced in the form of pure tin powder.

12. The method as defined in claim 11, wherein the amount of tin introduced is from 0.01% to 0.20% by weight of the polymer powder.

13. The method as defined in claim 10, which further includes the step of heat densifying the ground powder and incorporating the tin into the powder during the heat densifying step.

14. The method as defined in claim 13, wherein heat densification of the ground powder is effected at a temperature of 580°–590° F. for about 1 hour.

15. The method as defined in claim 14, wherein the metallic tin is introduced in the form of pure tin powder in the amount of about 0.01% to 0.20% by weight during said heat densification.

16. The method as defined in claim 10, which further includes the step of incorporating a supplemental polymer stabilizing agent in the ground powder, said supplemental agent being effective at the molding temperature of the polymer.

17. The method as defined in claim 16, wherein said supplemental stabilizing agent is N-phenyl-α-naphthylamine, in the amount of about 0.03% by weight, and said tin is in the form of pure tin powder in the amount of about 0.01% to 0.20% by weight.

18. The method as defined in claim 17, wherein heat densification of said ground polymer is effected in a rotated drum at a temperature of 580°–590° F. for about 1 hour, and said tin and supplemental stabilizing agents are incorporated during said heat densification.

* * * * *

UNITED STATES PATENT AND TRADEMARK OFFICE
CERTIFICATE OF CORRECTION

PATENT NO. : 4,312,961

DATED : January 26, 1982

INVENTOR(S) : Donald L. Winegar and Joseph M. Arde, Jr.

It is certified that error appears in the above-identified patent and that said Letters Patent are hereby corrected as shown below:

Column 3, line 53: "meterial" should read -- material --.

Column 4, line 60: "along" should read -- alone --.

Signed and Sealed this

Eleventh Day of May 1982

[SEAL]

Attest:

GERALD J. MOSSINGHOFF

*Attesting Officer*  *Commissioner of Patents and Trademarks*